Oct. 12, 1971     H. GESNER III     3,611,603

ILLUMINATED DISPLAY DEVICE

Filed June 2, 1969

INVENTOR.
HERBERT GESNER, III

BY Howard C. Miskin
ATTORNEY

United States Patent Office 3,611,603
Patented Oct. 12, 1971

3,611,603
ILLUMINATED DISPLAY DEVICE
Herbert Gesner III, 789 W. End Ave.,
New York, N.Y. 10025
Filed June 2, 1969, Ser. No. 829,432
Int. Cl. G09f 13/14
U.S. Cl. 40—130 B
8 Claims

ABSTRACT OF THE DISCLOSURE

An illuminated display device includes a housing of square transverse cross-section and is closed by a light transmitting panel at its front end. Triangular reflector plates have forwardly reflecting faces and extend rearwardly from the housing leading edges and delineate a hollow forwardly open pyramid with an apex proximate the housing rear wall. The reflector plates have a plurality of elongated transparent areas, and intermittently or continuously energized lamps of different colors direct light through the transparent areas onto the plates which reflect the light onto the front panel, as well as directly onto the front panel.

BACKGROUND OF THE INVENTION

The present invention relates generally to improvements in illuminated display devices and it relates particularly to an improved device for presenting an illuminated multicolored display by both reflected and direct light, which display may be of a static or changing nature.

Multicolored and illuminated display devices are employed for many purposes and in numerous environments, but those display devices which have been heretofore available possess important drawbacks and disadvantages. They are expensive, complicated and unattractive, particularly when applied to large areas, and possess little versatility and flexibility. Moreover, they are of limited application, difficult to install and maintain, and otherwise leave much to be desired.

SUMMARY OF THE INVENTION

It is a principal object of the present invention to provide an improved illuminated display device.

Another object of the present invention is to provide an improved multicolor illuminated display device.

Still another object of the present invention is to provide an improved multicolor device, which is self-illuminated directly and by reflection, and is of changing appearance.

A further object of the present invention is to provide an improved self-illuminated multicolor display device of modular configuration, which may be assembled with other such devices in any desired arrangement.

Still a further object of the present invention is to provide an improved display device of the above nature, characterized by its versatility, adaptability, ruggedness, low cost and attractive appearance.

The above and other objects of the present invention will become apparent from a reading of the following description taken in conjunction with the accompanying drawing.

In a sense the present invention contemplates the provision of an illuminated display device, comprising reflector means defining a forwardly reflecting surface delineating a recessed space, said forwardly reflecting surface having transparent areas, and a light source disposed rearwardly of said reflecting surface and exposed thereto through said transparent areas.

In its preferred form the improved display device includes a rectangular housing fo square transverse cross section, the walls of the housing, except for the front wall, being opaque, and the front square wall being light-transmitting, preferably transparent and colorless. The reflector means is of the shape of an open-bottom, four-sided pyramid with the open bottom thereof coinciding with the front of the housing, and the apex being proximate the housing rear wall. The front or inner faces of the pyramid are reflecting and a pattern of elongated linear transparent areas are formed in the pyramid walls. Electric lamps of different colors are located in the housing and the light therefrom passes through the transparent areas of adjacent pyramid faces, and is both directly incident on the housing front face or is reflected by the pyramid inside faces onto the front face. The lamps are intermittently energized.

The improved device produces a highly attractive, changing multicolored display on the front panel, which display may be informative, primarily decorative or both, by suitable configuration and arrangement of the transparent areas. The device is of a configuration and construction, so that it may be employed as a module for any desired arrangement or positioning thereof. The improved display device is simple, rugged, reliable, versatile, adaptable and of highly attractive appearance.

DESCRIPTION OF THE PREFERRED EMBODIMENT

Figure 1:
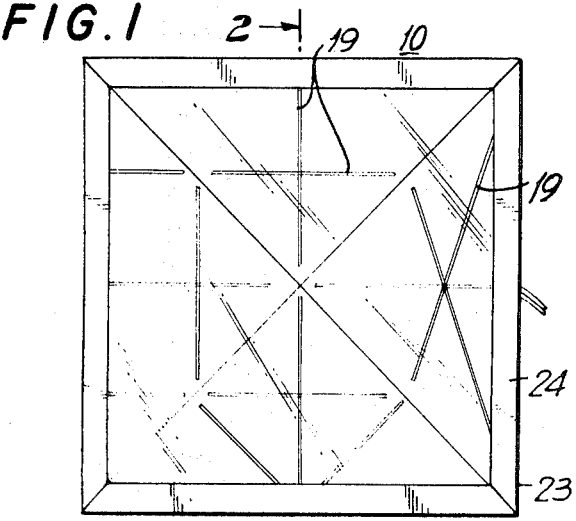
FIG. 1 is a front elevational view of a display device embodying the present invention.
Figure 3:
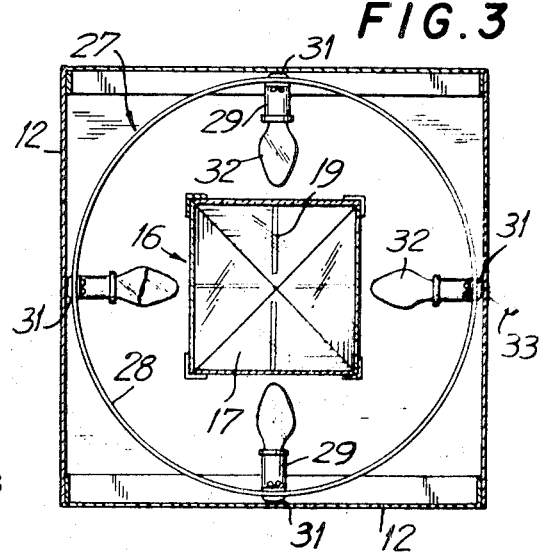
FIG. 3 is a sectional view taken along line 3—3 in FIG. 2.

Referring now to the drawing which illustrates a preferred embodiment of the present invention, the reference numeral 10 generally designates the improved illuminated display device which, although shown as of rectangular prismatic configuration with a square transverse cross-section, may be of other preferably prismatic configuration. The display device 10 comprises a housing 11 formed of any suitable material and includes similar rectangular top, bottom and side peripheral, preferably opaque, walls 12 provided along their rear edges with integrally formed inwardly directed flanges 13. Suitably secured to the rear faces of flanges 13 is a square rear wall 14.

A reflector member 16 is positioned in housing 11 and is of four-sided pyramidal configuration, including four symmetrical triangular panels 17, which define the walls of reflector member 16, panels 17 being formed of a transparent material, for example glass or an acrylic or other suitable polymeric resin. The rear faces of panels 17 are coated with reflector layers 18 of conventional composition, so that panels 17 are forwardly reflecting, while the rear surfaces of coatings 18 are preferably of a non-reflecting nature.

Portions of reflector coating layer 18 are omitted to provide transparent areas 19 through which light may be transmitted. Transparent areas 19 may assume any desired pattern or arrangement dependent on the desired visual effect, and are individually advantageously of thin elongated preferably linear shapes, as illustrated, each panel 17 being provided with a plurality of transparent areas 19, which may extend in different directions and intersect one another.

The outer rear borders of the bases of panels 17 engage and abut the front edges of peripheral walls 12, and the apexes thereof converge rearwardly to form the apex 20 of reflector member 16, the apex 20 being proximate the center of housing rear wall 14. A small pyramidal end corner piece 21 mates and embraces and is secured to the outer apexes of panels 17, and the adjacent edges of panels 17 are advantageously secured to each, so that reflector member 16 is a stable unitary structure. Panels 17 of reflector member 16 may be integrally formed as a unit, for example of metal or plastic, in any suitable manner, and if formed of metal, the front faces may be polished, reflecting surfaces and the transparent areas 19 may be defined by slits or other shaped openings in panels 17.

A square transparent panel or screen 22 closes the front end of housing 12 with the rear borders thereof engaging the front edges or base of panels 17. A square bezel 23 separably retains panel 22 and reflector member 16 in assembled condition with housing 16, and includes an inwardly directed front flange 24 engaging the front border of panel 22, and a rearwardly directed peripheral flange 26, which engages the front outer borders of housing walls 12.

Nested in the rear section of housing 11 and separably retained therein is a lighting assembly 27 which includes a support ring 28 of a diameter slightly less than the width of housing 11. Mounted on and arranged in quadrature about support ring 28 and medially positioned relative to respective reflector panels 17, are a plurality of circumferentially spaced pairs of longitudinally spaced, inwardly radially directed lamp sockets 29. Each pair of lamp sockets 29 is attached to an insulator base 30, which in turn is secured to mounting ring 28. Projecting outwardly of mounting ring 28 proximate each pair of lamp sockets 29 are pairs of protuberances 31, which engage the inside faces of housing walls 12.

Sockets 29 hold replaceable electric lamps 32, the pairs of which, or all of which, may be of different colors. In addition, each of sockets 29, or selected one of the sockets 29, houses a flashing unit, generally a thermally-actuated switch or of other conventional construction, which intermittently energizes and de-energizes corresponding lamps 32 in the known manner, when the unit is connected to a source of current. Lamps 32 are connected through sockets 29 and associated flasher members in parallel across the opposite conductors of a two-wire electric line 33, which in turn is connected to a source of current in the conventional manner. It should be noted that the lamps may be connected to an external energization control network, which may randomly intermittently energize lamps 32, or may energize and de-energize the lamps 32 in a predetermined timed sequence.

In the operation of the improved illuminated display device described above, the energized lamps 32 project through transparent sections 19 of each panel 17 beams of light of corresponding cross section, parts of which projected light beams are reflected by opposing panels 17 onto panel 22, and parts of which beams are directly incident on panel 22. The composite pattern of the beams projected on panel 22 and observed on its front face is multicolored and changes with time to provide a highly attractive display. The display device 10 may be easily and rapidly disassembled for maintenance, servicing or modifications and alterations, merely by removing bezel 23 and separating panel 22 and reflector member 16, and if desired, lamp assembly 27 from housing 11. The device may be rapidly assembled in an opposite manner.

Figure 2:
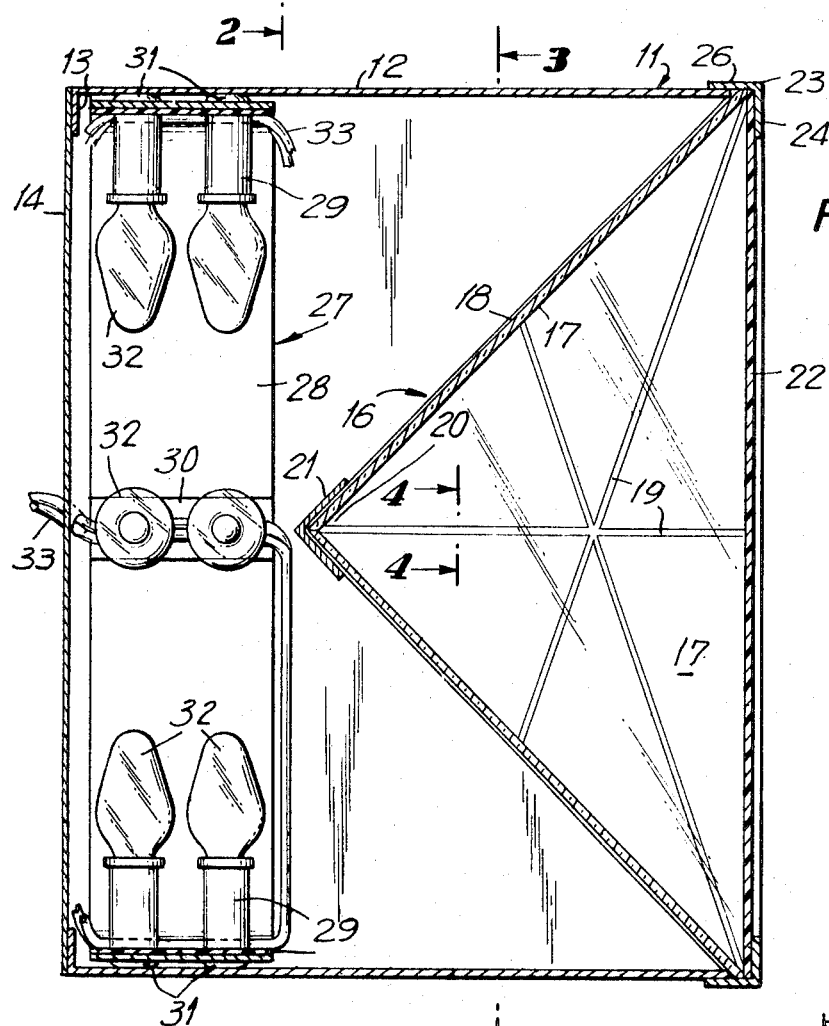
FIG. 2 is an enlarged sectional view taken along line 2—2 in FIG. 1.
Figure 4:
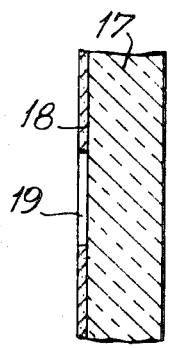
FIG. 4 is an enlarged fragmentary sectional view taken along line 4—4 in FIG. 2.

If desired transparent sections 19 may be in the form of a message, such as "Buy Bonds," which message will impinge directly onto panel 22, and be reflected by other panels and then onto panel 22. Further, while apex 20 is shown in FIG. 2 spaced from rear wall 14 for clearness, it can be spaced abutting rear wall 14 so as to reduce to a minimum any leakage of light from one set of lamps 32 onto the rear faces of remote panels 17 and thence through its corresponding transparent areas 19. Such leakage will diminish the sharp clear hues of the colors of the lamps selected, since they will in time overlap the illumination of the lamps in the other sets and result in shading of the hues such as red and yellow, forming an orange display.

What I claim is:

1. An illuminated display device, comprising a pyramidal shaped reflector having a light transparent front face and reflector surfaces facing interiorly and toward the front face, the reflector surfaces having transparent areas formed therein, and a plurality of light sources disposed rearwardly of said reflector surfaces and being so positioned that light will pass through a transparent area to be internally reflected on said reflector surfaces and then onto said front face or directly onto the front face.

2. The illuminated display device of claim 1, wherein said light sources comprise electric lamps.

3. The illuminated display device of claim 2, comprising a housing having a light transparent front, said reflector pyramid front face being the base of said pyramid, said pyramid being positioned in said housing with the base thereof registering with said housing front, said lamps being disposed between the walls of said housing and said pyramid.

4. The illuminated display device of claim 2, comprising a housing of square transverse cross-section having a light transparent front, said reflector pyramid front face being the base of said pyramid, said pyramid being four-sided and positioned in said housing with the base thereof registering with said housing front, said lamps being disposed between the walls of said housing and said pyramid.

5. The display device of claim 2, wherein at least some of said lamps are of different colors.

6. The display device of claim 2, wherein said lamps are intermittently energized.

7. The display device of claim 2, including a transparent panel registering with said pyramid base.

8. The illuminated display device of claim 2, comprising a rear wall and a light transparent front, said reflector pyramid being positioned in said housing with the base thereof registering with said housing front, and the apex thereof being proximate said housing rear wall, said lamps being positioned proximate said housing rear and peripheral walls.

References Cited

UNITED STATES PATENTS

| | | | |
|---|---|---|---|
| 1,133,935 | 3/1915 | Conner et al. | 240—10 S |
| 1,200,487 | 10/1916 | Grimm | 240—10 S |
| 1,240,379 | 9/1917 | Sheppard | 40—140 B UX |
| 1,283,751 | 11/1918 | Hay | 240—10 |
| 1,619,096 | 3/1927 | Walsh | 40—130 B |
| 1,945,721 | 2/1934 | Aubuchon | 40—130 B UX |

JEROME SCHNALL, Primary Examiner

R. CARTER, Assistant Examiner

U.S. Cl. X.R.

240—10